Patented Apr. 10, 1951

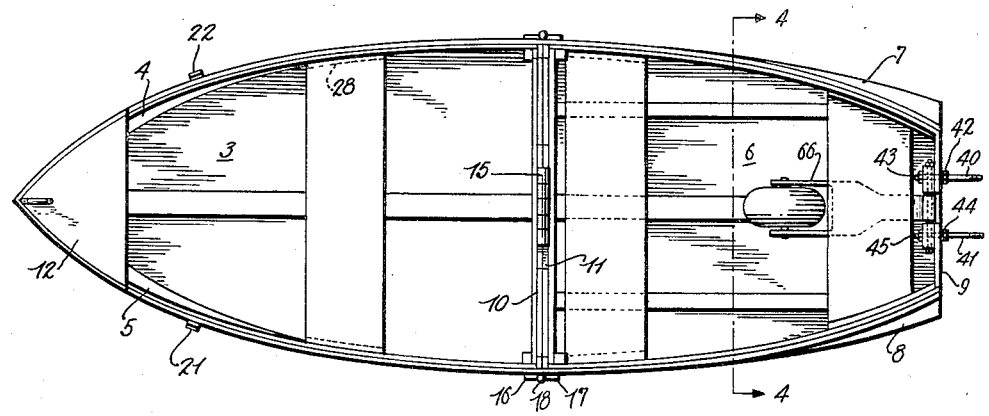

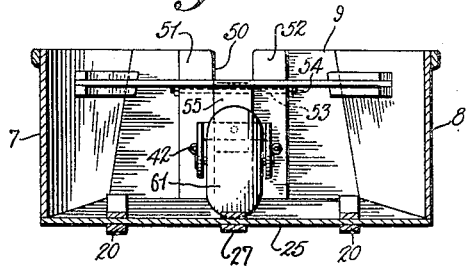
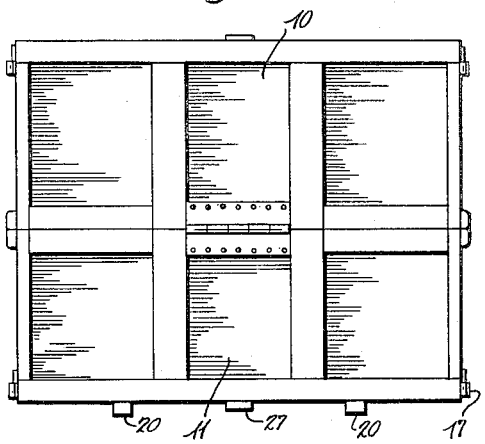
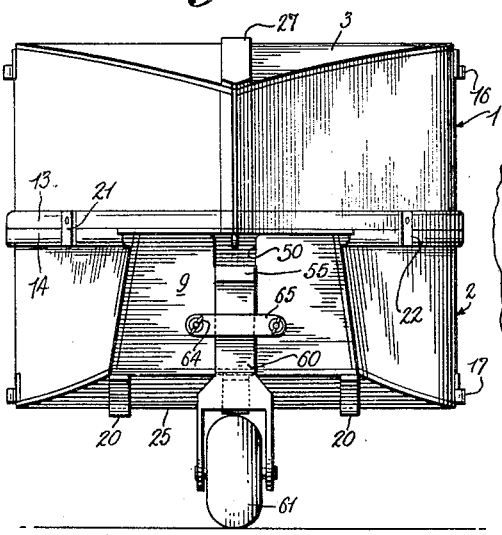
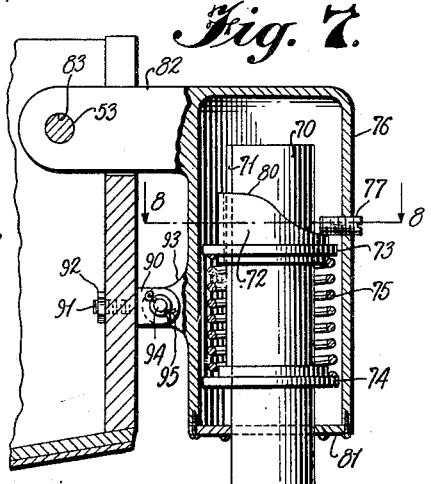
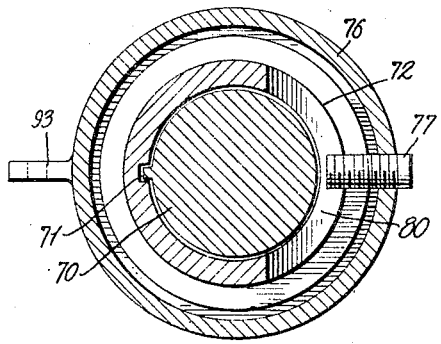
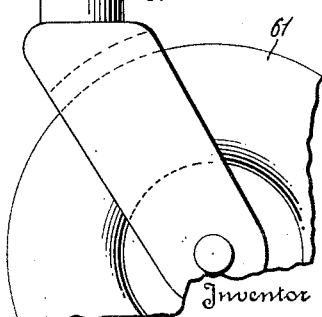

2,548,274

UNITED STATES PATENT OFFICE 2,548,274

COMBINATION BOAT AND TRAILER

Donald J. Van Oeveren, Arlington, Va.

Application August 11, 1948, Serial No. 43,587

1 Claim. (Cl. 9—2)

My invention relates to an improvement in boat-trailer combinations and more particularly to that type wherein the boat is of the sectional folding type, adapted to be carried by the rear bumper of an automobile in folded condition and to be unfolded and ready for use after being transported, as a trailer, to the desired location.

Sectional folding boats of various types are well known in the prior art, and have heretofore been used in trailer combinations wherein they are usually provided with a plurality of wheels in order to enable them to be used as a trailer when being transported from place to place. However, my invention varies widely from structures such as I have referred to in that only one wheel is employed as the supporting medium when the structure is used as a trailer, said wheel being permanently attached to the stern board of the boat and swiveled in such a way that when the boat is in the water the wheel may be positioned under the rear seat, and when the structure is to be transported by automobile, the wheel may be conveniently swiveled to a position underneath the aft-end of the boat where it supports the same when used as a trailer.

The apparatus comprising my invention is of simple and durable construction and therefore readily adaptable to practical manufacture and sale at a moderate cost. In its folded position it fully utilizes all of the space within the hull to provide an adequate compartment which is protected from water and dust for transporting and storage of supplies and equipment, whereas in its extended position when the swivel wheel is swung upwardly and inwardly and stored beneath the removable rear seat, the craft presents a well-shaped conventional appearance with no large external protuberances or noticeable departure in design from other boats of this size and type. When attached to an automobile the forward section can be raised as the lid of a trunk to facilitate packing or can be locked in its closed position to form a streamlined luggage carrier, which is secured to the standard bumper with the simple hitch provided. Disconnected from the towing vehicle the assemblage can be moved to the water's edge or over portages in the manner of handling a wheelbarrow. There is no trailer carriage, framework or wheel assembly left to be stored or dragged along. With the wheel folded inside the hull and the front section locked on top of the rear, the hull forms a relatively safe compartment for equipment and protects the wheel assembly from the weather and possibility of theft or tampering. From this arrangement the boat can be easily and quickly launched by unfolding the sections and locking the same in a rigid extended position.

It is therefore the broad object of this invention to provide some means for a convertible assemblage which will permit a sectional boat to be used as a trailer without necessity of removal of various wheel assemblies or detachment of any parts, either when the boat is used as such or as a trailer.

A further object of the invention is to provide an assembly of this character wherein the boat when folded can be transported manually, as a wheelbarrow, to the desired location without the addition of any means other than that used to connect the structure to the rear of an automobile.

It is a still further object of the invention to provide such means in a device of this general description that, due to the tight interfitting of the sectional parts in folded relationship, will permit the same to be used as a watertight carrier for luggage when assembled as a trailer.

The description of the invention which follows should be sufficient to make it clear that my invention is a real advance over known devices. By my unique construction the swiveled wheel is at all times a fixed unit of the entire assembly, which need not be removed, through some form of complex mechanism, in order for the trailer combination to be used as a boat. Accordingly, the disadvantages of devices heretofore known, such as the necessity of removal or replacing the wheel assembly, or the removal or replacement of various kindred parts in order to transform the assembly from boat to trailer, and vice versa, are avoided.

This application is a continuation-in-part of my copending application, Serial No. 728,016, now abandoned, directed to the same subject-matter, and filed February 12, 1947.

For a clear understanding of the invention, reference is made to the drawings accompanying and forming a part of the specification in which like reference characteristics designate the same or similar parts in the various views.

Figure 1 is a plan view of the assemblage when positioned for use as a boat;

Figure 2 is a side elevation of the invention illustrated in Figure 1;

Figure 3 is a longitudinal section of the invention as illustrated in Figures 1 and 2 but with the fore and aft sections folded for use as a trailer combination;

Figure 4 is a detailed section of the aft portion taken on the line 4—4 of Figure 1;

Figure 5 is an end view of the invention as illustrated in Figure 3;

Figure 6 is an end view opposite to that shown in Figure 5, of the invention illustrated in Figure 3;

Figure 7 is a part sectional view of an alternate embodiment of the invention directed to the swiveled wheel construction, and Figure 8 is a cross-sectional view of the swiveled wheel structure taken on the line 8—8 of Figure 7.

Referring to the drawings, it will be seen that the boat is comprised of two sections generally indicated as 1, the foreward section, and 2, the aft section. Each of these sections is a self-contained unit in the sense that each of them are individually waterproof and separate from each other as will be hereinafter described.

For instance, the foreward section has the usual bottom 3, sides 4 and 5, and the aft section is similarly provided with a bottom 6 and sides 7 and 8. The aft section is provided with a stern board or transom 9, the particular construction of which will be referred to later. As has been stated, these two sections are self-contained and separated by individual members 10 and 11 which makes each of them separate bouyant compartments. In order that the two sections may be conveniently swiveled or folded, a hinge 15 is provided connecting the two end members 10 and 11. When the boat is unfolded as shown in Figures 1 and 2, the two sections are maintained in this position by a suitable locking mechanism. Although it is obvious other means may be employed, I have shown the same to comprise separate lugs 16 and 17 mounted upon each side of each section. Each of these lugs is provided with an aperture and located so that the separate apertures upon each side coincide when the assembly is in its extended position, enabling a pin 18 to be inserted therethrough, locking the lugs, and consequently these sections, in firm extended relationship with respect to each other.

Upon the under side of the bottom are provided two spaced longitudinal members 20 which are adapted to be used to mount the foreward end of the structure, when folded, upon the bumper of an automobile. Members 20 can be of wood or angle iron, although I have shown them as solid bars.

The structure of the hull of the boat is more clearly indicated in Figure 3 wherein it will be seen that the bottom of the boat is designated at 25, the keelson at 26 and the usual type of keel employed in boats of this type at 27. The seats are indicated at 28, 29 and 30. Rear seat is removable in order that after the wheel is swiveled inboard, wheel and mount can be placed out of the way under that seat. The two sections of the hull closely correspond in contour at the gunwales 13 and 14, as will be seen from an inspection of Figure 5. This permits the gunwales of the two sections, when in folded position, the forward section upon the aft, to coincide and form a watertight juncture. To facilitate positioning of these two sections in this manner, guide strips, such as those illustrated at 21 and 22 may be affixed to the foreward section so that, upon folding, they will closely embrace the gunwales of the aft section. These will also serve to maintain the two sections in proper alignment when the assembly is folded for trailer use. As seen in Figure 2, the foreward decked in portion 12 does not abut the transom when in folded position. It may be fabricated to do so, but often it is practical, for ventilation purposes, to leave space between deck 12 and transom, as shown.

It will be seen, by reference to Figure 3, that I have provided a simple expedient for connecting the assemblage to the rear end of an automobile through the members 20. These members are interconnected to appropriate vertical members 35 which are affixed to the rear bumper of the automobile. The vertical members 35 and the members 20 are each provided with an aperture to receive a locking bolt to maintain an interconnection of the two as indicated in Figure 3. When disconnected from members 35, the assembly may be manually carried from place to place by using the projections 20 as handlebars and conveying the entire unit by this means in wheelbarrow fashion.

Reference is now particularly made to the wheel structure. As shown in Figure 4, the transom of the boat construction I have here illustrated is slotted as at 50, a relatively short distance downwardly towards the bottom of the boat. The depth of slot 50 may vary from one-fourth to one-third of the height of the transom, as is desired or necessary to permit proper pivotal action of the wheel mount. On each side of the slot are affixed strengthening members 51 and 52 which are also employed as bearing support members to accommodate a bolt 53 upon which the arm 55 supporting the wheel is mounted. The arm 55 is apertured to permit entrance of the bolt which is then fixed in position by threading suitable nuts 54 upon each end thereof. The vertical carrier wheel support, including an upright member 60, is affixed at approximately right angles to the transverse arm 55 by any suitable means such as a nut and bolt connection, 60a, although it is apparent that members 55 and 60 may be cast in one piece. The wheel 61 is adapted to swivel by any suitable means, as by a swivel mount well known in the art, and indicated by dotted lines, Figure 5. In order to provide a cushioning effect to absorb the shock of rapid movement when the assembly is used as a trailer combination, I employ a resilient spring means. To this end, in the modification illustrated in Figure 3, two rearwardly extending posts 40 and 41, spaced a suitable distance from each other, are affixed to the transom of the boat and as shown in Figures 1 and 4, are also mounted through the members 51 and 52 to which I have referred. These are maintained in place by suitable nuts 42, 43, 44 and 45 mounted upon each side of the transom. The upright support member 60 is positioned intermediate these two posts as will be seen by reference to Figure 5 and the cushioning effect for the wheel is obtained by the following apparatus. A member 65, transverse to the posts 40 and 41, is provided with suitable apertures to enable the said posts to be inserted therethrough, and, as illustrated in Figure 3, is positioned aft of and immediately abutting member 60. Upon its opposite side, member 65 also abuts two helical springs 63, each positioned over the respective posts 40 and 41. These springs are maintained in position together with member 65 by wing nuts 64 which permit removal of the spring and transverse member 65. Support member 60 is, of course, provided with some form of wheel bearing means such as a forked unit 66, as shown in Figure 1, to permit free rotation of any suitable type of pneumatic wheel 61. In this form of wheel mount, shocks and jars occurring while the trailer is in motion are readily absorbed by the spring means referred to.

In Figure 7 I have illustrated an alternative form of wheel support means which involves a modification of the shock absorbing media which I have already described. In this modification the wheel support consists of a shaft 70 having along one longitudinal edge thereof a rib 71 designed to engage an eccentric sliding sleeve 72 which is mounted for vertical motion upon the wheel support 70. The eccentric sliding sleeve is provided with a collar 73 and an oppositely positioned sleeve and collar 74 is rigidly mounted, by welding or other common media, upon shaft 70, the two collars 73 and 74 being suitably spaced to receive therebetween an helical spring 75. This helical spring will absorb the shock of movement as the wheel support 70, and necessarily collar 74, are reciprocated by any bumps or jars while the vehicle is in motion. The helical spring and wheel support assembly is mounted within a suitable casing 76. This is provided with a stop pin 77 threaded for insertion in an obvious manner and adapted to bear upon the eccentric sliding surface 80 of the referred to sleeve. The lower portion of the casing may be closed off by plate 81 so as to prevent emergence of collar 74 and accompanying parts when the wheel is pivoted to its position within the boat. The upper portion of casing 76 is formed with an integral member 82 extending transversely or at right angles to the casing. This member is provided with an aperture 83 adapted to fit the pivot pin 53 already referred to.

By reference to Figure 8 it will be seen that although the foregoing construction permits a reasonable amount of rotation of wheel 61 within casing 76, the apparatus is designed to keep the wheel in fore and aft relationship with respect to the longitudinal axis of the boat. In other words, if the wheel is rotated to either right or left, the key 71 forces rotary movement of the eccentric sleeve in the same amount causing the rising eccentric surface 80 to bear upon the stop pin 77. This will force sleeve 72 downwardly and compress spring 75, and the consequent pressure will tend to return the sliding eccentric surface to the position shown in Figure 7, necessarily carrying the wheel mount with it. Hence, despite travel over rough surfaces which might temporarily throw the wheel off its proper fore and aft axis, the wheel will always return to that position with respect to the boat, and will tend to stay in that position. This not only simplifies handling of the assembly as a trailer, but the shock absorbing characteristics of this type of wheel mount are of obvious added advantage.

Any sort of means well known within the art can be utilized to restrain the wheel support shown in Figure 7 from rotation upon the swivel bolt, upon positioning the same in a vertical manner with respect to the stern of the boat, when it is desired to transport the unit as a trailer combination. The means I have illustrated and described with respect to the modification illustrated in Figure 3 may be utilized for this purpose. In other words, the posts 40 and 41 may be positioned so as to closely embrace the wheel support casing 76 and, with member 65 in position, prohibit the movement of the said casing.

The preferred embodiment of this aspect of my invention is illustrated in Figure 7 wherein I have shown a practical and effective means for retaining the wheel mount in the position therein shown, that is, in a position for using the assembly as a trailer. In this modification a lug 90 is affixed to the transom of the boat at a point substantially below the plane of the swivel bearing. This lug can be maintained in position by any common means and I have illustrated a bolt 91 and complementary nut 92 to perform this object. The lug is apertured to receive a locking pin. A complementary lug 93 may be welded to the casing 76 or preformed as a cast part of the casing. This lug also is apertured to receive a retaining pin. After the wheel is swung outboard and with the axis of the wheel post 70 in a vertical position, the two apertures in each of the lugs 90 and 93 may be easily aligned and a locking pin 94 inserted therethrough to securely maintain the wheel in its illustrated position. The pin may be retained in place by having an enlarged head at one end and by inserting a cotter pin 95 through the opposite end. There are other obvious media which can be employed to maintain pin 94 in position.

In the modification just described, it is apparent that no parts of the assembly need be removed or added to the trailer combination in order to utilize the combination either as a boat or as a boat-trailer. The simple media herein described and particularly that embodiment disclosed in Figure 7, obviates the necessity of providing additional stowage space for the wheel when the combination is in use as a boat and eliminates the necessity of employing additional mechanism to locate the wheel in position for use as a trailer.

It should be understood that it is not desired to limit this invention to the exact details of construction or to the precise mode of operation herein shown and described, for various modifications within the scope of the claim may occur to persons skilled in the art.

I claim:

A convertible trailer boat comprising two sections hingedly attached to enable folding of one section upon the other, a carrier wheel support and horizontally pivoted mount therefor comprising a forked unit and a right angular extension on said unit, said extension being pivotally secured to the stern of the lower section for movement in a vertical plane, lateral posts mounted on the stern of the lower section adjacent each side of the forked unit shock absorbing means resiliently engaging said support comprising a lateral member engaging said posts transversely to said support, springs abutting said member and mounted on said posts, and retaining means on said posts engaging said springs to maintain said mount in substantial vertical position for operative traveling relation.

DONALD J. VAN OEVEREN.

REFERENCES CITED

The following references are of record in the file of this patent:

UNITED STATES PATENTS

| Number | Name | Date |
| --- | --- | --- |
| 1,794,796 | Reichert et al. | Mar. 3, 1931 |
| 1,844,003 | Brown | Feb. 9, 1932 |
| 2,192,282 | Warner | Mar. 5, 1940 |
| 2,219,254 | Davis | Oct. 22, 1940 |
| 2,254,437 | Marney | Sept. 2, 1941 |

FOREIGN PATENTS

| Number | Country | Date |
| --- | --- | --- |
| 30,181 | Australia | Nov. 17, 1930 |
| 875,804 | France | Oct. 6, 1942 |